United States Patent

Julius

[11] Patent Number: 4,776,250
[45] Date of Patent: Oct. 11, 1988

[54] SQUARE FOR GLASS CUTTING

[76] Inventor: Monte L. Julius, 927 Sunset Dr., Irving, Tex. 75061

[21] Appl. No.: 88,513

[22] Filed: Aug. 20, 1987

Related U.S. Application Data

[63] Continuation of Ser. No. 880,714, Jul. 1, 1986, abandoned.

[51] Int. Cl.$^4$ .......................... B26D 5/00; B27B 3/00; B27B 5/18
[52] U.S. Cl. ........................................ 83/745; 33/473; 33/474; 33/475; 33/480
[58] Field of Search ................. 83/745, 468, 472, 473, 83/474, 475, 479, 480, 481

[56] References Cited

U.S. PATENT DOCUMENTS

| | | | |
|---|---|---|---|
| 252,436 | 1/1882 | Darling | 33/480 |
| 1,232,613 | 7/1917 | Scheeder | 33/475 |
| 1,507,798 | 9/1924 | Seghers | 33/473 |
| 3,296,702 | 3/1965 | Feddish | 83/486 X |
| 4,608,902 | 9/1986 | Ivey | 33/474 |

FOREIGN PATENT DOCUMENTS 527 of 1889 United Kingdom ................. 33/468

OTHER PUBLICATIONS

Julius, "Introducing Our New One Piece Triangle Square", 1982.

Primary Examiner—E. R. Kazenske
Assistant Examiner—Scott A. Smith
Attorney, Agent, or Firm—Hubbard, Thurman, Turner & Tucker

[57] ABSTRACT

A square for glass cutting has a triangular shaped phenolic plastic body having a head supporting base member, a straight edge, and a straight edge strengthening member. The base member has a plurality of apertures having diameters of a first dimension. A head member includes first and second head plates interconnected and spaced by a bridge to sandwich the base member. The first and second plates have a plurality of apertures having centers corresponding to the centers of the base member apertures, but having diameters of a second dimension less than the first dimension but equal to the diameters of set screws, whereby when the head member is loosely attached to the head support member by the set screws the squaring of the first head plate automatically squares the second head plate and the tightening of the set screws maintains the squared relationship between the head plates and the straight edge member. The support member forms the hypotenuse of the right angle triangle and provides straight edge strength at the top where needed and base member support to prevent rotation of the straight edge member.

3 Claims, 1 Drawing Sheet

SQUARE FOR GLASS CUTTING

This application is a continuation of application Ser. No. 880,714, filed July 1, 1986, now abandoned.

BACKGROUND OF THE INVENTION

This invention relates to glass cutting accessory devices and more particularly to a square for use in cutting glass pieces having close right angle tolerances.

In the past a square used for cutting glass has included a head supporting base member, a straight edge, and a straight edge strengthening member forming a right angle triangle having an aperture with a shape corresponding to the shape of the triangle.

The head supporting base member of the square, having walls forming three laterally spaced circular apertures of first dimensions for purposes hereinafter described, supports first and second head plates.

The first and second head plates each have three circular apertures whose centers correspond to the centers of the base member apertures, but whose diameters are substantially smaller for attachment by set screws to opposing sides of the base member. The first and second head plates thereby form adjustable heads which coact with the straight edge forming a square usable from any side of the glass plate. The adjustable heads provide a means for realigning the square when out of square through misuse, e.g. dropping or setting it down too hard. The prior art square is manufactured by Julius Enterprises of Irving, Texas.

In principle, the square according to the invention corresponds to the known square. The essential difference is that the head plates are bridged together to overcome a squaring adjustment problem existing with the prior art device.

The problem with the prior art device is that when the square gets out of alignment and the set screws loosened to adjust one or the other or both head plates, it is difficult to get both plates back into alignment at the same time and maintain the alignment while tightening the set screws.

SUMMARY OF THE INVENTION

Accordingly, it is the object of this invention to provide an improved square.

Another object of the invention is to provide a square having improved square adjustment capability.

Briefly stated the invention includes a square for use in glass cutting. The square including a head bearing member having a straight edge member perpendicular thereto; the head bearing member having first and second head members which are bridged together and adjustably attached to the straight edge member whereby when misaligned the alignment of a first head member automatically aligns the second head member thereby facilitating realignment.

BRIEF DESCRIPTION OF THE DRAWINGS

Other objects and features of the invention will be more readily understood from the following detailed description and appended claims when read in conjunction with the accompanying drawings in which:

DESCRIPTION OF THE PREFERRED EMBODIMENT

Figure 1:
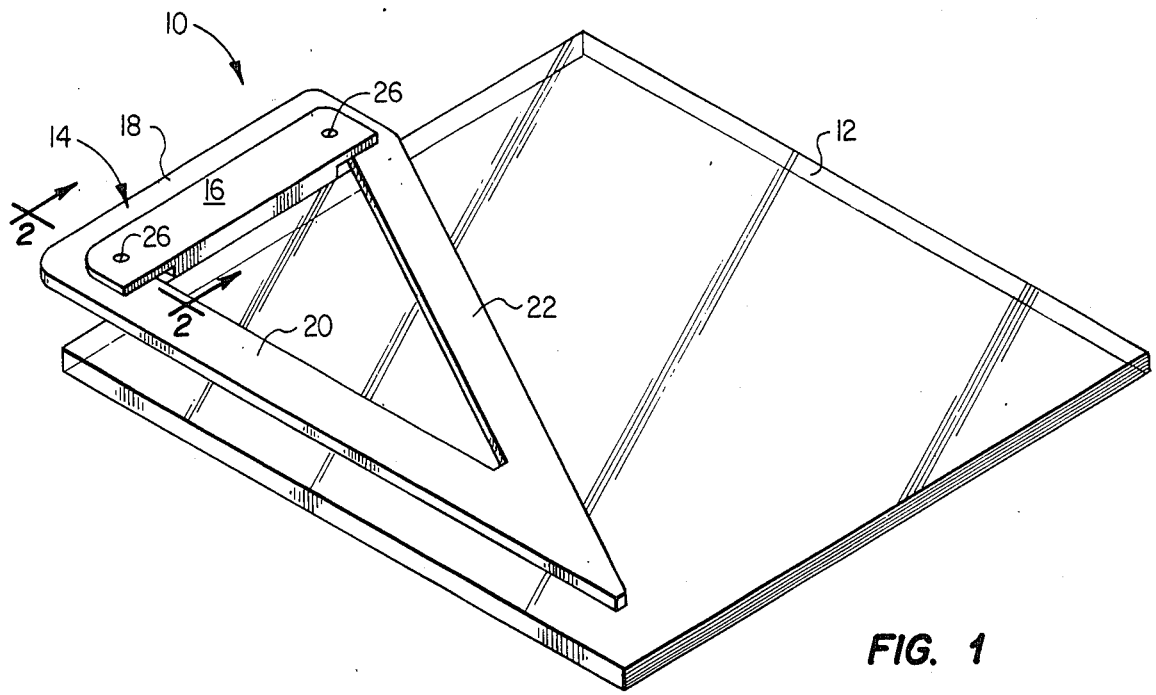
FIG. 1 is an isometric view showing the square constituting the subject matter of this invention being used in conjunction with a glass plate.

The square 10 constituting the subject matter of the invention is shown (FIG. 1) in an operative position on a glass plate 12. The square includes a triangularly shaped member 14, which is preferably of a phenolic plastics material having a thickness of about ¼ inch, to which is adjustably attached a head forming member 16. The square being made of phenolic plastic has excellent physical properties, high tensile and flexural strength, very good moisture and chemical resistance; it will maintain its physical condition over a long period of time without warping. Although the square may be a solid triangle with the head attached to the bottom edge of the base edge, preferably, the square is constructed as hereinafter described for reasons set forth hereinafter.

The triangularly shaped member 14 has walls forming an aperture having a shape corresponding to the shape of member 14. The aperture divides the triangular shaped member into a base member 18, a straight edge blade member 20, and a blade strengthening member 22 all of substantially equal widths. The blade strengthening member forms the hypotenuse of the triangle.

Figure 2:
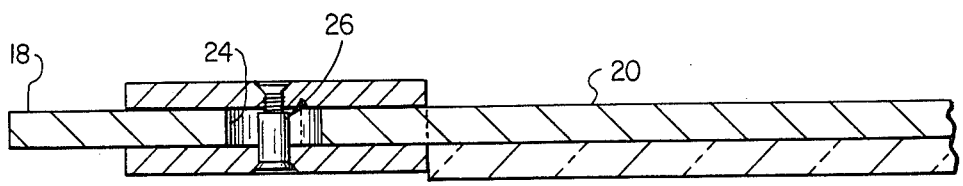
FIG. 2 is a partial sectional view of the invention taken along line 2—2 of FIG. 1.

The base member 18 (FIGS. 1 and 2) includes walls 24 forming a plurality of apertures. The number of apertures shown in FIG. 1 is two, but the length of the member dictates the number of apertures required. As shown in FIG. 2, the apertures have a diameter substantially larger than the diameter of the set screws 26.

The straight edge or cutting edge member 20 being of phenolic plastics provides a glass smooth cutting edge which is scratch and chip resistant. While the hypotenuse member 22 provides blade strength at the top against lateral movement where it is needed, and in addition supports the base member to prevent straight edge blade rotation.

It will be appreciated by those skilled in the art that the strengthening member can take other shapes than the hypotenuse of the triangle without departing from the scope of the invention.

The head member 16 comprises a thick (¾ inch) phenolic laminated plastic having a pair of spaced head plates 28 and 30 integrally bridged together. The width and length of the plates are such that the plates set in from the outer edges of the triangle for reducing the likelihood of the square getting out of alignment due to dropping or rough handling (FIG. 1). This feature constitutes the principle reason why the solid configuration is not preferred over the apertured configuration where the head member has to be attached to the outer edge of the base member.

The head plates have walls forming corresponding countersunk apertures having diameters of a dimension smaller than the dimension of the base member apertures, but corresponding to the diameters of the set screws 26. The centers of the apertures correspond in location to the centers of the base member apertures (FIG. 2). Each set screw 26 has a female member 32 with internal threads for receiving a male attachment member 34.

Figure 3:
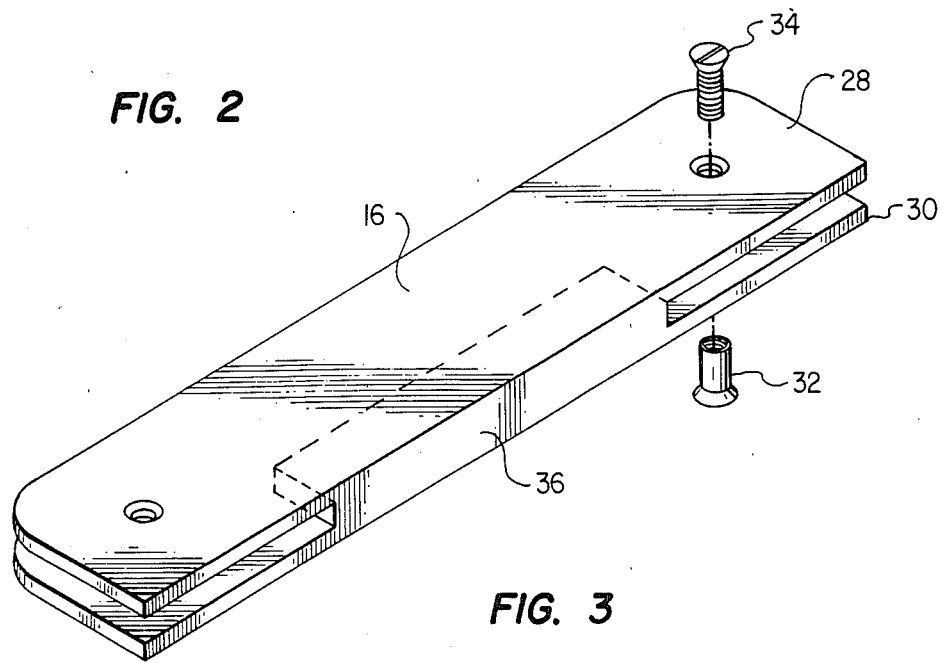
FIG. 3 is an exploded isometric view of the adjustable head of the square.

The head plates 28 and 30 are interconnected by a centrally disposed bridge 36 (FIG. 3). The length of the bridge is limited by the length of the aperture base of the triangle and base member assembly requirements. The bridge 36 has a width equal to the thickness of the base member 18 for sandwhiching the base member. The head member 16 when assembled astraddle the base member 18 FIGS. 1 and 2) is squared by properly adjusting one head and tightening the set screws sufficiently to maintain the square adjustment. Thus, it is seen that by squaring one head plate of the head member 16 the head member automatically squares the other head plate. This is a decided improvement over the prior art device in which the plates had to be squared independently of each other using the same set screws.

Although several embodiments of the invention have been described, it will be apparent to a person skilled in the art that various modifications to the details of construction shown and described may be made without departing from the scope of the invention.

What is claimed is:

1. A square for glass cutting comprising:
   a head means, said head means including a base member integrally connecting first and second spaced head plate members to the base member for receiving a straight edge means therebetween, said base member being of a length and width substantially less than the length and width of said head plate member, said plate members having a plurality of spaced apertures with preselected dimensions;
   a straight edge means having a plurality of spaced apertures of preselected dimensions substantially larger than the preselected dimensions of the head means apertures, said apertures of the head means and the straight edge means being located for squaring adjustment of the straight edge means with respect to the head base member; and
   a plurality of connector means including body portions extending through the apertures of the head means plate members and the straight edge means, and body portion retention means connected to ends of the body portions wherein the straight edge means may be adjusted about the connector body portions for squaring with respect to the base member and secured to the head means plate members by the body portion retention means for maintaining the squared position wherein said straight edge means is a triangular shaped body including a base portion, the head means base member being mounted adjacent to an inside edge of the base portion.

2. A square according to claim 1 wherein the plurality of apertures formed in the straight edge means and head means are, respectively, elongated apertures and circular apertures said head means apertures having centers corresponding to the centers of the straight edge apertures and diameters substantially smaller than the diameters of the straight edge means, and the body portions of the connector means have diameters corresponding to the head means aperture diameters.

3. A square according to claim 1 wherein the straight edge means includes said base portion and a straight edge portion integrally connected to a first end of the base portion to form a right angle therewith and further including a straight edge top end strengthening portion interconnecting the top end of straight edge portion to a second end of the base portion for resisting lateral bending and rotational movement of the straight edge portion during use.

* * * * *